(12) United States Patent
Tiwari et al.

(10) Patent No.: US 9,491,127 B2
(45) Date of Patent: Nov. 8, 2016

(54) APPARATUS AND METHOD FOR AUTOMATICALLY DETERMINING A VERSION OF A FILE

(75) Inventors: SunilKumar P. Tiwari, Aundh (IN); Gauravsagar Tadelkar, Yerwada (IN)

(73) Assignee: Avaya Inc., Basking Ridge, NJ (US)

( * ) Notice: Subject to any disclaimer, the term of this patent is extended or adjusted under 35 U.S.C. 154(b) by 1374 days.

(21) Appl. No.: 12/951,231

(22) Filed: Nov. 22, 2010

(65) Prior Publication Data

US 2012/0131433 A1    May 24, 2012

(51) Int. Cl.
*G06F 17/00* (2006.01)
*H04L 12/58* (2006.01)
*G06Q 10/10* (2012.01)

(52) U.S. Cl.
CPC ............. *H04L 51/08* (2013.01); *G06Q 10/107* (2013.01); *H04L 51/16* (2013.01)

(58) Field of Classification Search
USPC .......................................... 715/229; 709/206
See application file for complete search history.

(56) References Cited

U.S. PATENT DOCUMENTS

| 7,895,276 B2* | 2/2011 | Massand ....................... 709/206 |
| 2007/0143425 A1* | 6/2007 | Kieselbach et al. .......... 709/206 |

* cited by examiner

*Primary Examiner* — Mohammed-Ibrahim Zuberi

(57) ABSTRACT

A method for versioning is provided. The method includes receiving a command to compose a primary communication, and receiving a command to include a secondary communication with the primary communication. The method also includes determining a version of the secondary communication, and transferring the primary communication, the secondary communication, and the version from a sending device for delivery to and display by a recipient device.

15 Claims, 10 Drawing Sheets

From: Sender
To: Recipient
Subject: Please Review
Content-history: author="<author>" sender="<sender>" timestamp="<date-time>" content-name="<filename>" version="<x.y.z>"

HEADER 604

Attachment: document1.doc

ATTACHMENT 606

BODY 608

Please review the attached document.

EMAIL 602

DISPLAY 600

Figure 6

From: Sender
To: Recipient
Subject: Please Review

HEADER  704

Attachment: document1.doc        SECONDARY COMM.  706

Version: document1.vh        TERTIARY COMM.  708

PRIMARY COMM.  710

Please review the attached document.

EMAIL  702

DISPLAY  700

Figure 7

APPARATUS AND METHOD FOR AUTOMATICALLY DETERMINING A VERSION OF A FILE

TECHNICAL BACKGROUND

When multiple authors work together on a file, such as a document, computer program, presentation, or the like, they often exchange the file through email with each author making changes to the file and sending the modified file back to the other authors for review and further changes.

Currently, email attachments are not versioned for any changes made to them during an email conversation. While the subject of the email may be sorted to understand the conversation, the changes in the attachment, date of changes, and file history is not evident without actually comparing the attachments.

OVERVIEW

In an embodiment, a method for versioning is provided. The method includes receiving a command to compose a primary communication, and receiving a command to include a secondary communication with the primary communication. The method also includes determining a version of the secondary communication, and transferring the primary communication, the secondary communication, and the version from a sending device for delivery to and display by a recipient device.

In another embodiment, a versioning system is provided. The versioning system includes a sending device configured to transfer communications for delivery to and display by a recipient device. The sending device is also configured to receive a command to compose a primary communication, and to receive a command to include a secondary communication with the primary communication. The sending device is further configured to determine a version of the secondary communication, and to transfer the primary communication, the secondary communication, and the version to the recipient device.

In a further embodiment, a non-transitory computer-readable medium having instructions stored thereon for operating a computer system is provided. The instructions, when executed by the computer system, direct the computer system to receive a command to compose a primary communication, and to receive a command to include a secondary communication with the primary communication. The instructions also direct the computer system to determine a version of the secondary communication, and to transfer the primary communication, the secondary communication, and the version for delivery to and display by a recipient device.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

FIG. 6 illustrates a graphical user interface of a versioning system.

FIG. 7 illustrates a graphical user interface of a versioning system.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
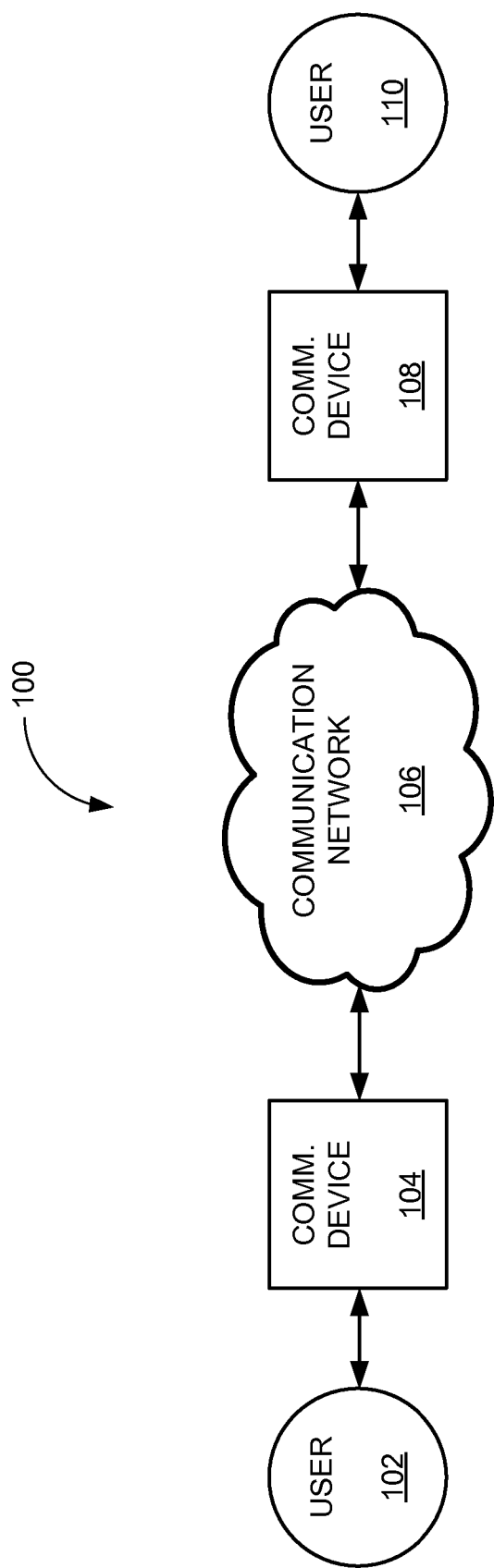
FIG. 1 illustrates an embodiment of a versioning system.

FIG. 1 illustrates an embodiment of versioning system 100. In this example embodiment, versioning system 100 includes communication device 104, configured to communicate with communication device 108 through communication network 106. User 102 uses communication device 104, while user 110 uses communication device 108.

By way of non-limiting example, users 102 and 110 may be collaborating on authorship of a document and may correspond by email. In this example, user 102 creates a document and emails the document to user 110 for review and changes. User 102 creates an email message as a primary communication and attaches the document to the email as a secondary communication. User 102 operates communication device 104 to send the email with the attachment to communication device 108 through communication network 106 for delivery to user 110.

User 110 then edits the document, creates another email (another primary communication), attaches the modified document as a modified secondary communication and emails the modified document back to user 102 for further review and changes. In this example, communication devices 104 and 108 are configured to automatically add version information to the communications between users 102 and 110, allowing for changes made to the document to be tracked.

At any point in this process, either user may issue a command to their respective communication device, and the communication device, in response to the command, displays the primary communication, the secondary communication, the version information, or any combination thereof. Note that either user may issue a command to the communication device requesting any version of the secondary communication, in addition to the latest version of the secondary communication. Thus, users 102 and 110 may view the version information or any version of the secondary communication within their respective communication device simply by issuing a command to the communication device.

In some embodiments, there may be a plurality of secondary communications attached to a primary communication, allowing the transfer of a plurality of files or documents in a single primary communication. Some or all of the secondary communications may have version information automatically added to the communications. This allows users to collaborate on multiple files where some or all of the files include version information without having to generate primary communications for each of the files. Any or all of this version information may be displayed at the request of a user.

Figure 2:
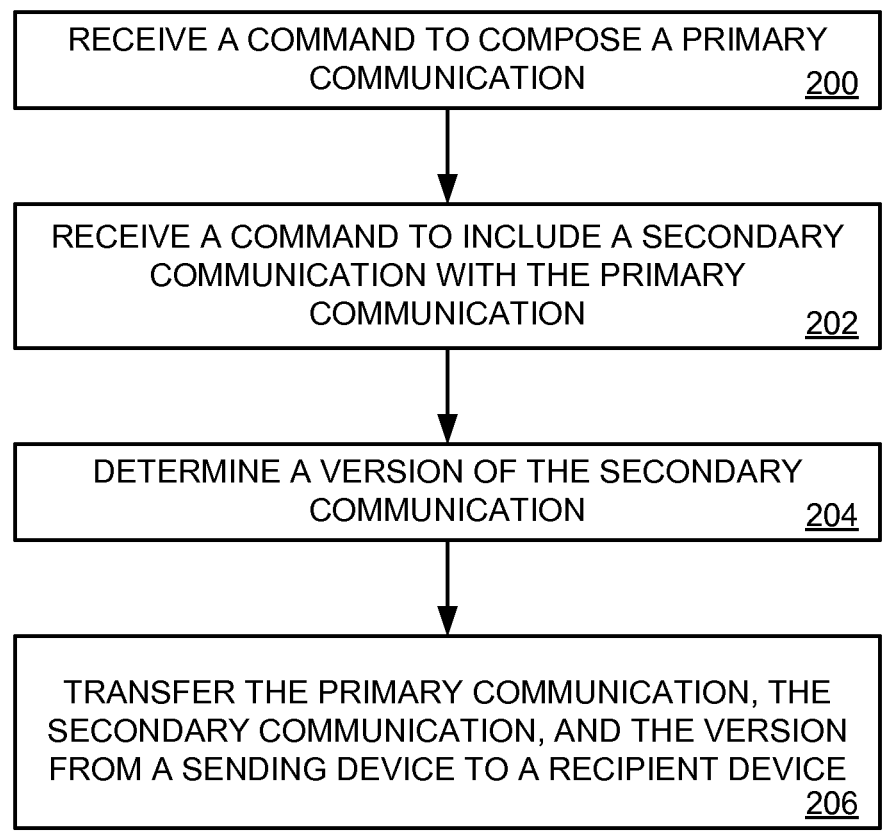
FIG. 2 illustrates an embodiment of a method for operating a versioning system.

FIG. 2 illustrates an embodiment of a method for operating a versioning system. In this example method, using the versioning system of FIG. 1, communication device 104 (sending device) receives a command from user 102 to compose a primary communication (an email in this example), (operation 200). Communication device 104 also receives a command from user 102 to include a secondary communication (a document in this example) with the primary communication (the email), (operation 202).

Communication device 104 then determines a version of the secondary communication (the document), (operation 204), and transfers the primary communication (the email), the secondary communication (the document), and the version from a sending device (communication device 104) to a recipient device (communication device 108), (operation 206).

Figure 3:
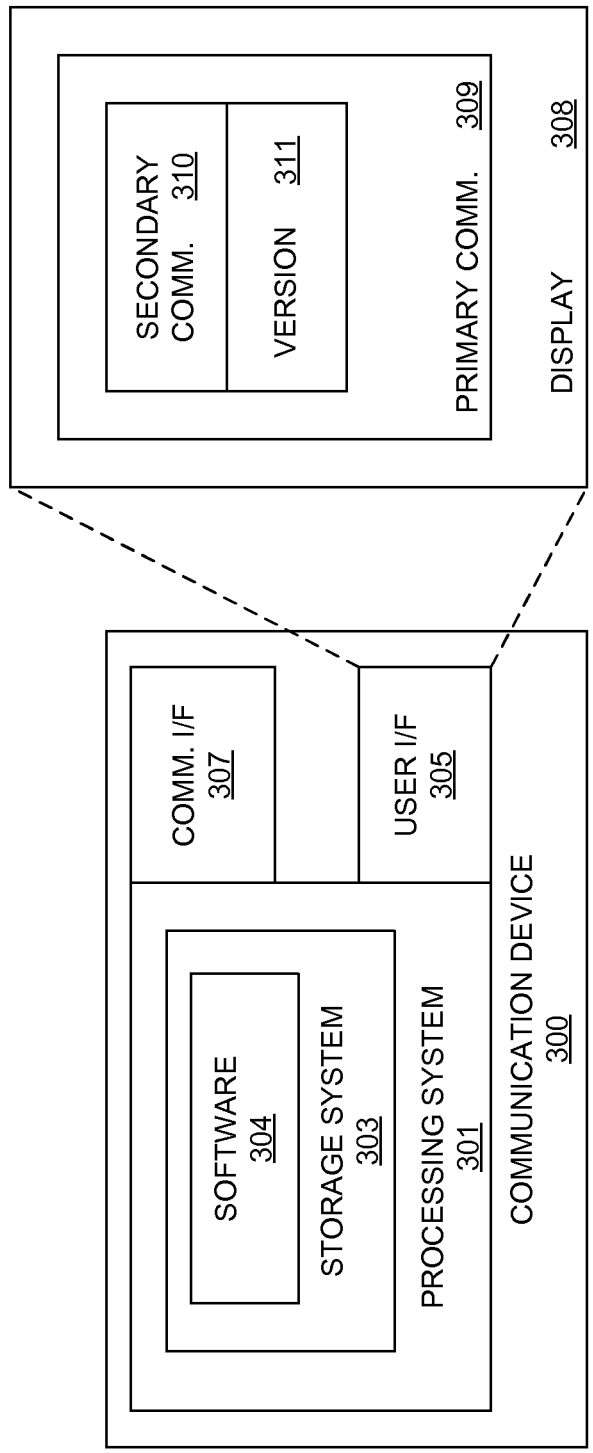
FIG. 3 illustrates an embodiment of a communication device operable as a versioning system.

FIG. 3 illustrates an embodiment of communication device 300 operable as a versioning system. Communication device 300 may be implemented as part of a versioning system as shown in FIG. 1. Communication device 300 includes communication interface 307, user interface 305, and processing system 301. Processing system 301 is linked to communication interface 307 and user interface 305 through a bus. Processing system 301 includes processing circuitry and storage system 303 that stores operating software 304.

Communication interface 307 includes components that communicate over communication links, such as network cards, ports, RF transceivers, processing circuitry and software, or some other communication devices. Communication interface 307 may be configured to communicate over metallic, wireless, or optical links. Communication interface 307 may be configured to use TDM, IP, Ethernet, optical networking, wireless protocols, communication signaling, or some other communication format—including combinations thereof.

Figure 8:
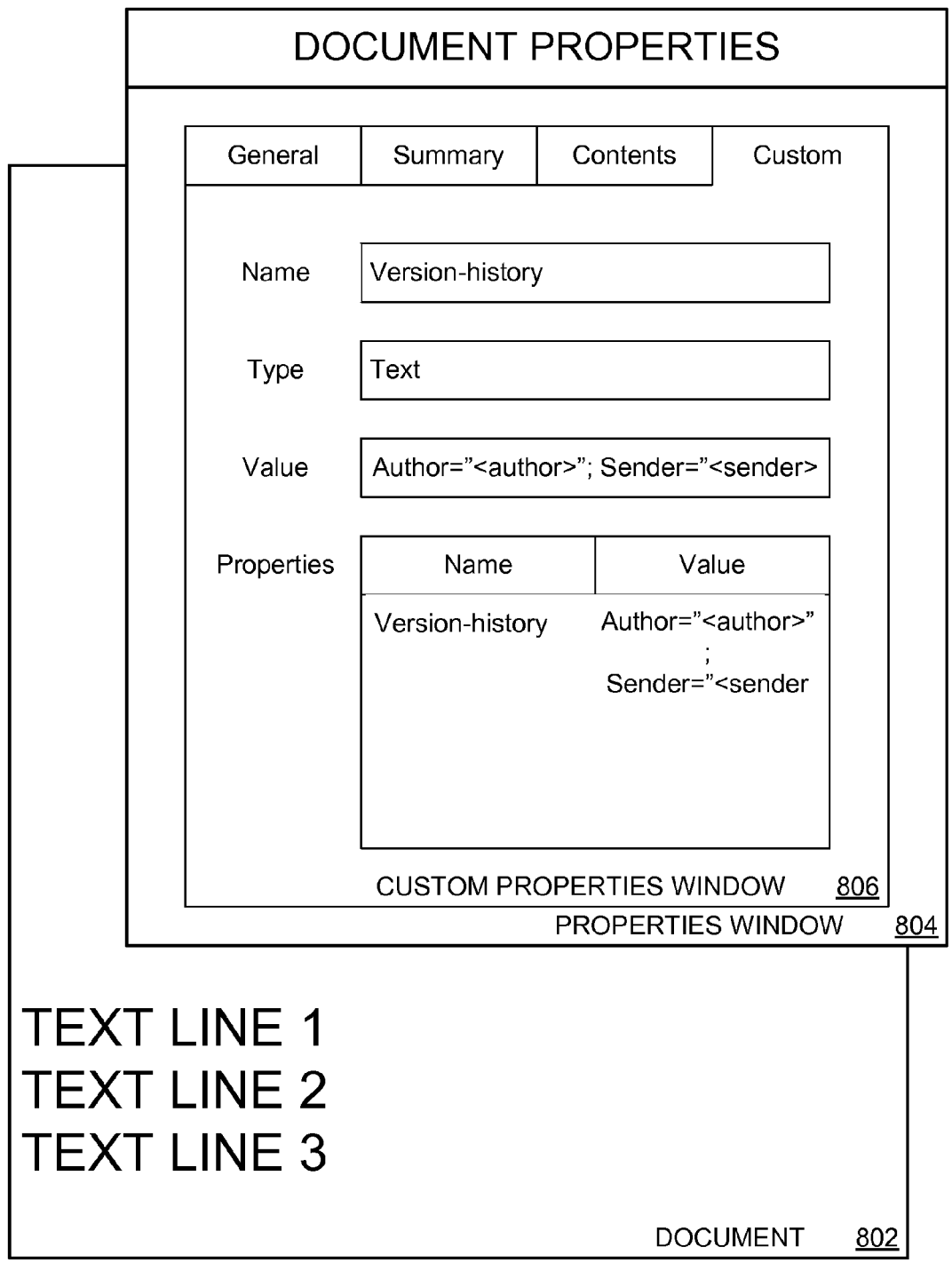
FIG. 8 illustrates a graphical user interface of a versioning system.

User interface 305 includes components that interact with a user. User interface 305 may include a keyboard, display 308, mouse, touch pad, or some other user input/output apparatus. Display 308 includes a graphical user interface (GUI) as illustrated in FIGS. 6-8.

Processing system 301 includes a microprocessor and other circuitry that retrieves and executes operating software 304 from storage system 303. Storage system 303 includes a disk drive, flash drive, data storage circuitry, or some other memory apparatus. Operating software 304 includes computer programs, firmware, or some other form of machine-readable processing instructions. Operating software 304 may include an operating system, utilities, drivers, network interfaces, applications, or some other type of software. When executed by processing system 301, operating software 304 directs processing system 301 to operate communication device 300 as described herein.

In this non-limiting example, display 308 displays primary communication 309, secondary communication 310, and version 311 to a user. This information may be displayed to a user in any of a wide variety of configurations. Examples of these configurations are illustrated in FIGS. 6-8.

Figure 4:
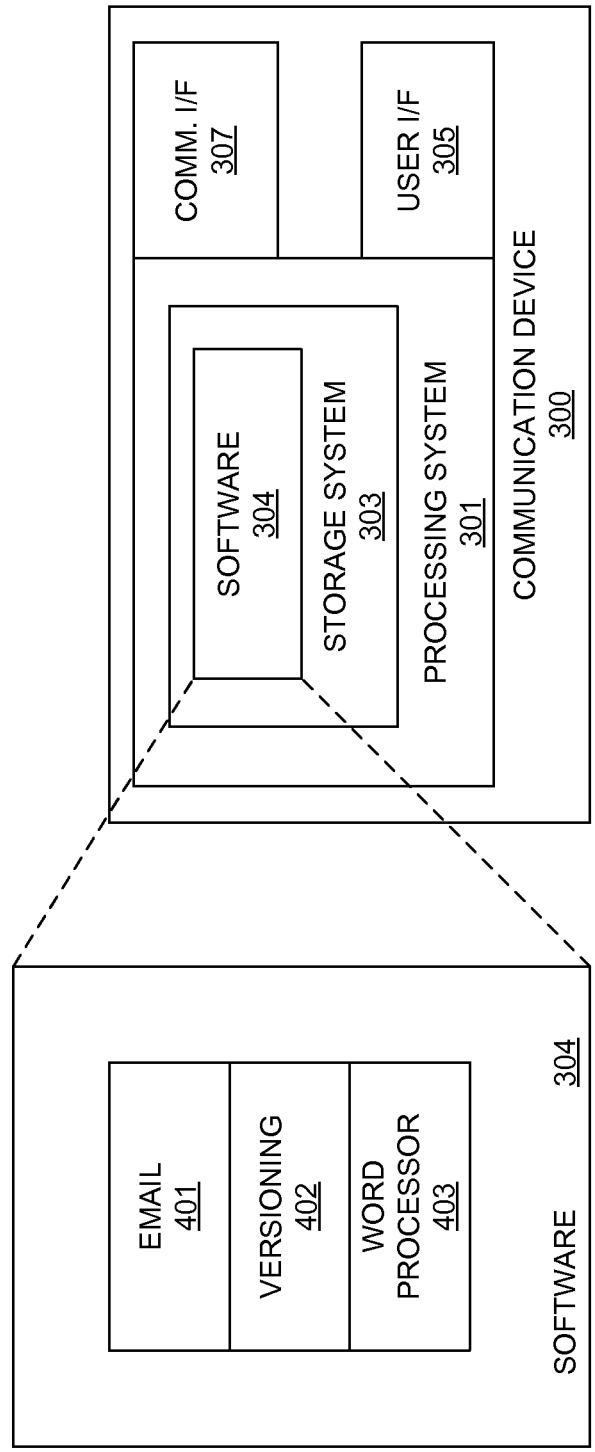
FIG. 4 illustrates an embodiment of a communication device operable as a versioning system.

FIG. 4 illustrates an embodiment of communication device 300 operable as a versioning system. Communication device 300 may be implemented as part of a versioning system as shown in FIG. 1. Communication device 300 includes communication interface 307, user interface 305, and processing system 301. Processing system 301 is linked to communication interface 307 and user interface 305 through a bus. Processing system 301 includes processing circuitry and storage system 303 that stores operating software 304.

Communication interface 307 includes components that communicate over communication links, such as network cards, ports, RF transceivers, processing circuitry and software, or some other communication devices. Communication interface 307 may be configured to communicate over metallic, wireless, or optical links. Communication interface 307 may be configured to use TDM, IP, Ethernet, optical networking, wireless protocols, communication signaling, or some other communication format—including combinations thereof.

User interface 305 includes components that interact with a user. User interface 305 may include a keyboard, display 308, mouse, touch pad, or some other user input/output apparatus. Display 308 includes a graphical user interface (GUI) as illustrated in FIGS. 6-8.

Processing system 301 includes a microprocessor and other circuitry that retrieves and executes operating software 304 from storage system 303. Storage system 303 includes a disk drive, flash drive, data storage circuitry, or some other memory apparatus. Operating software 304 includes computer programs, firmware, or some other form of machine-readable processing instructions. Operating software 304 may include an operating system, utilities, drivers, network interfaces, applications, or some other type of software. When executed by processing system 301, operating software 304 directs processing system 301 to operate communication device 300 as described herein.

In a non-limiting example, software 304 includes email system 401, versioning system 402, and word processing system 403. Email system 401 is configured such that when executed by processing system 301, it may compose, send, and receive email messages. Versioning system 402 is configured such that when executed by processing system 301, it may determine a version of a file. Word processing system 403 is configured such that when executed by processing system 301, it may create or edit a file or document. The created or edited file or document can then be used by versioning system 402.

Versioning system 402 may determine a version of a file using any of a wide variety of different methods. These versions may take any of a wide variety of forms including those illustrated in FIGS. 6-8. For example, a version may include any combination or subset of the identity of an initial author, an identity of a current sender, a time stamp, a file identity, and a numerical version. In some examples the version may be appended to the secondary communication.

Figure 5:
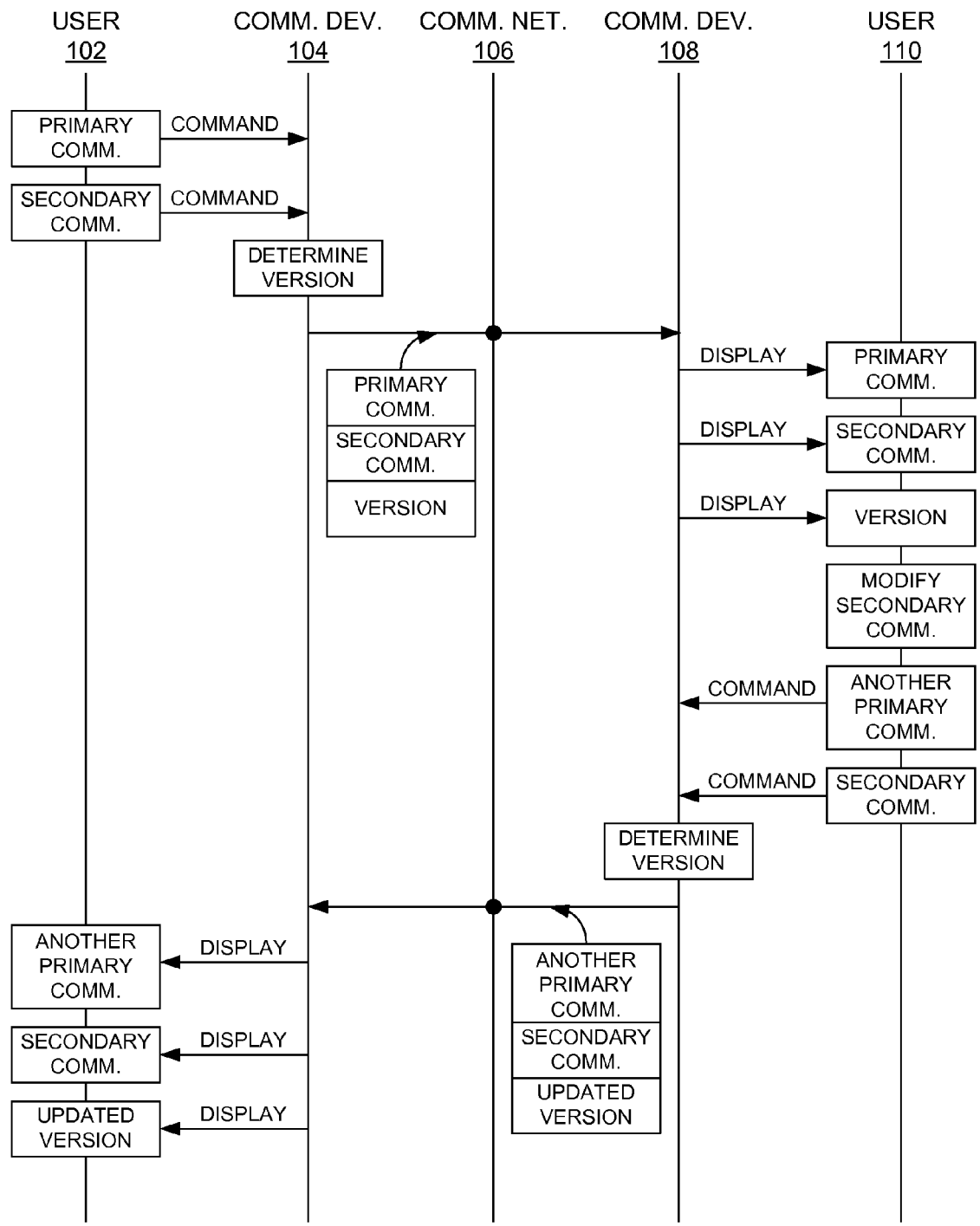
FIG. 5 illustrates an embodiment of a method for operating a versioning system.

FIG. 5 illustrates an embodiment of a method for operating a versioning system. In this non-limiting example of a method for operating a versioning system, user 102 sends a command to communication device 104 to compose a primary communication. User 102 also sends a command to communication device 104 to include a secondary communication with the primary communication. Communication device 104 determines a version for the secondary communication, and sends the primary communication, the secondary communication, and the version to communication device 108 through communication network 106.

Communication device 108 displays the primary communication, the secondary communication, and the version to user 110. User 110 then modifies the secondary communication. User 110 sends a command to communication device 108 to compose another primary communication. User 110 also sends a command to communication device 108 to include the modified secondary communication with the another primary communication.

Communication device 108 determines an updated version for the modified secondary communication, and sends the another primary communication, the modified secondary communication, and the updated version to communication device 104 through communication network 106. In some embodiments, communication device 108 may ask a user to enter a version or to enter information about the changes that is then stored as a part of the version information. Communication device 104 then displays the another primary communication, the modified secondary communication, and the updated version to user 102.

FIG. 6 illustrates a graphical user interface of a versioning system. In this non-limiting example, display 600 includes a graphical user interface (GUI) configured to display email 602 to a user. Email 602 includes header 604 (including a version denoted as a Content-history), attachment 606 (a secondary communication), and body 608 (a primary communication).

In this example, the version (Content-history) includes the identity of an author, the identity of a sender, a timestamp, a content-name, and a numerical version of the secondary communication shown as attachment 606 (document1.doc in this example). In this non-limiting example, the numerical version of the secondary communication includes three fields, x, y, and z. These three fields may be used to represent differing magnitudes of changes made to attachment 606 (document1.doc). In some examples, fields x, y, and z may include alphanumeric characters in addition to numbers.

For example, field x may be used to designate major changes to attachment 606, while field y may be used to designate minor changes, and field z may be used to designate insignificant changes. Versioning system 402 from FIG. 4 may be configured to automatically determine the magnitude of changes made to attachment 606. For example, versioning system 402 may compare the previous version of attachment 606 to the modified version of attachment 606 and determine the extent of changes made to attachment 606. The extent of changes may be quantified in any of a wide variety of ways. For example, versioning system 606 may determine the fraction of the document changed, the quantity of changes, the quantity of additions or deletions, or the like in order to determine the extent of changes to the document.

When versioning system 402 determines that a large number of changes have been made to attachment 606, it may signal a major change to attachment 606 by incrementing field x. When versioning system 402 determines that a small number of changes have been made to attachment 606, it may signal a minor change to attachment 606 by incrementing field y. When versioning system 402 determines that an insignificant number of changes have been made to attachment 606, it may signal an insignificant change to attachment 606 by incrementing field z.

FIG. 7 illustrates a graphical user interface of a versioning system. In this non-limiting example, display 700 includes a graphical user interface (GUI) configured to display email 702 to a user. Email 702 includes header 704, attachment 706 (a secondary communication), version 708 (a tertiary communication), and body 710 (a primary communication).

In this example, version 708 is included within email 702 as a tertiary communication. Version 708 points a user to document1.vh where a version history for secondary communication 706 (attachment document1.doc) may be found. The version history (document1.vh) may be a text file containing version information such as that illustrated in header 604 of FIG. 6. Other examples may user a comma separated values (csv) format, binary format, or the like for the version history.

FIG. 8 illustrates a graphical user interface of a versioning system. In this non-limiting example, a secondary communication is illustrated as document 802. Document 802 includes a version history as metadata associated with document 802. This allows the version history to travel with document 802 (secondary communication) as an integral part of document 802 avoiding the possibility of the version history becoming separated from the secondary communication.

In this example, document 802 includes properties window 804 that may be accessed from within document 802. Properties window 804 includes custom properties window 806, which in turn includes a number of tabs such as general, summary, contents, and custom. FIG. 8 illustrates a custom properties tab within custom properties window 806.

In this example, the custom properties tab includes fields for the name of the custom property (Version-history), the type of custom property (Text), the value of the custom property, and the name and values of the current properties. Communication devices within a versioning system are configured to automatically update the Version-history property of document 802 as described herein.

Figure 9:
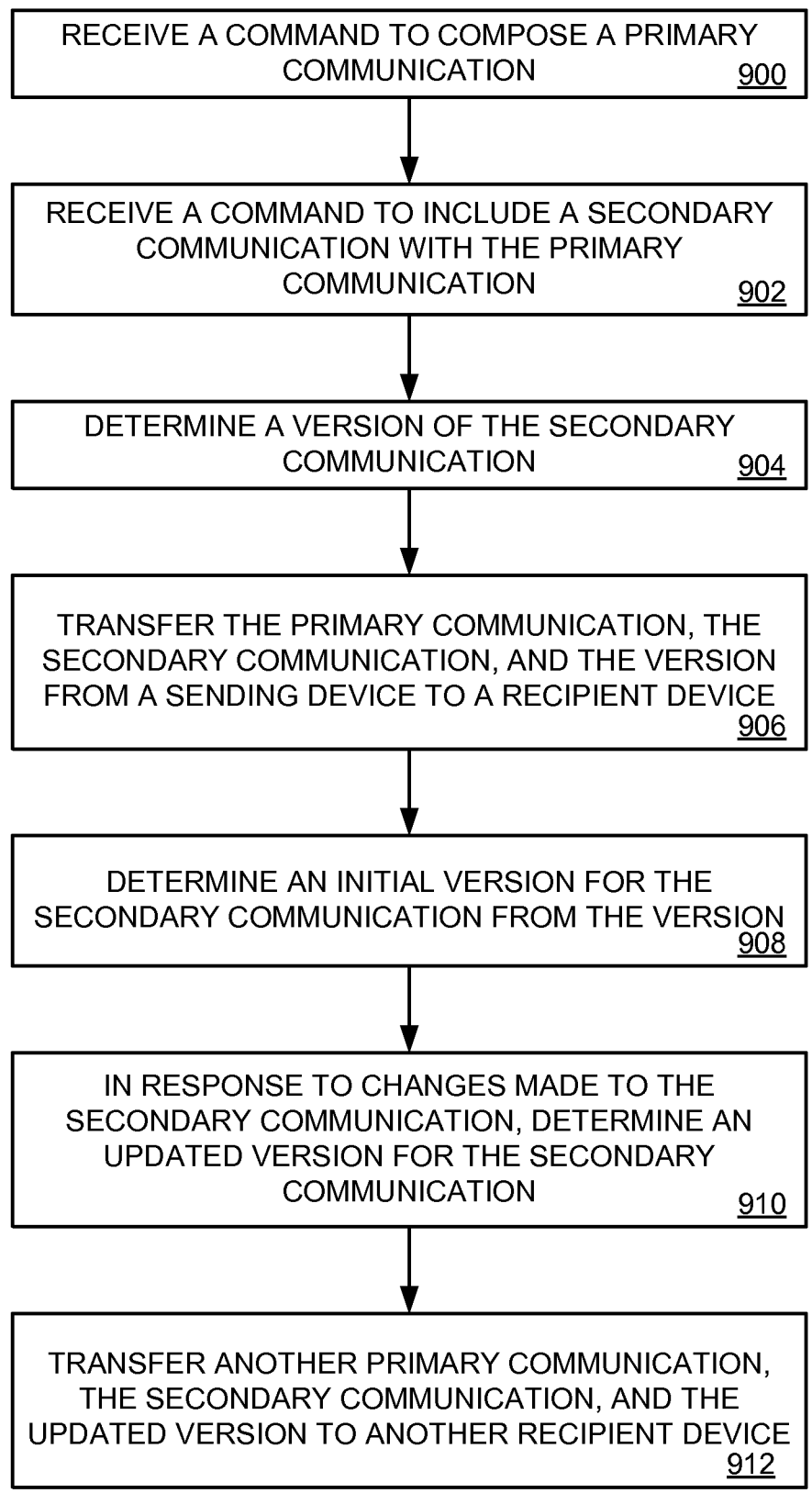
FIG. 9 illustrates an embodiment of a method for operating a versioning system.

FIG. 9 illustrates an embodiment of a method for operating a versioning system. In this example method, using the versioning system of FIG. 1, communication device 104 receives a command from user 102 to compose a primary communication (an email in this example), (operation 900). Communication device 104 also receives a command from user 102 to include a secondary communication (a document in this example) with the primary communication (the email), (operation 902).

Communication device 104 then determines a version of the secondary communication (the document), (operation 904), and transfers the primary communication (the email), the secondary communication (the document), and the version from a sending device (communication device 104) to a recipient device (communication device 108), (operation 906).

Communication device 108 determines an initial version for the secondary communication from the version, (operation 908). In response to changes made to the secondary communication, communication device 108 determines an updated version for the secondary communication, (operation 910). Communication device 108 may determine that the new secondary communication is an updated version of a previous secondary communication in any of a variety of ways. For example, communication device 108 may look at metadata in the document, the document name, the storage location of the document, or by comparing the content when determining that the current document is a revision of a previous document. Communication device 108 (the recipient device) or another sending device then transfers another primary communication (a new email), the modified secondary communication, and the updated version to the sending device (communication device 104) or another recipient device, (operation 912).

Figure 10:
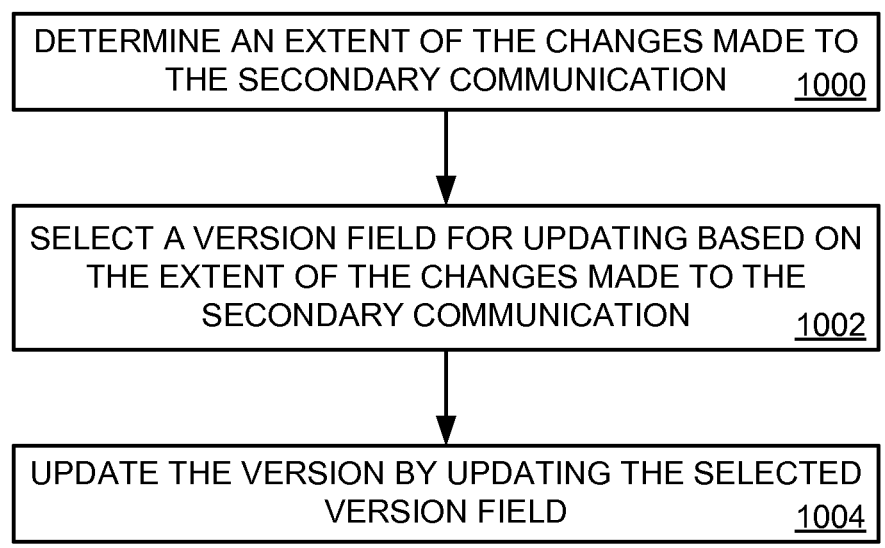
FIG. 10 illustrates an embodiment of a method for operating a versioning system.

FIG. 10 illustrates an embodiment of a method for operating a versioning system. In this example method, optionally included in the versioning method of FIG. 9, communication device 108 determines an extent of the changes made to the secondary communication, (operation 1000). Communication device 108 then selects a version field for updating based on the extent of the changes made to the secondary communication, (operation 1002), and then updates the version by updating the selected version field, (operation 1004).

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for versioning comprising:
    receiving through a user interface a command to compose a primary communication;
    receiving through the user interface a command to include a secondary communication with the primary communication;
    determining in a processing system a version of the secondary communication in a processing system;
    transferring through a communication interface the primary communication, the secondary communication, and the version from a sending device for delivery to and display by a recipient device;
    determining in the processing system an initial version for the secondary communication from the version;
    in response to changes made to the secondary communication, determining in the processing system an updated version for the secondary communication and an extent of the changes made to the secondary communication;
    selecting a version field in the processing system for updating based on the extent of the changes made to the secondary communication in the processing system;
    updating the version in the processing system by updating the selected version field, wherein the version includes two or more version fields; and
    transferring through the communication interface another primary communication, the secondary communication, and the updated version from the recipient device for delivery to and display by the sending device.

2. The method of claim 1 wherein the primary communication is an email and the secondary communication is a computer readable file.

3. The method of claim 1 wherein the version is transferred in the form of metadata.

4. The method of claim 1 wherein the version is appended to the secondary communication.

5. The method of claim 1 wherein the version includes one or more of a filename, an author's name, a sender's name, and a timestamp.

6. The method of claim 1 wherein the version includes a version history of the secondary communication.

7. The method of claim 1 wherein the version is transferred in the form of a tertiary communication.

8. A versioning system comprising:
    a communication interface configured to:
        transfer communications for delivery to and display by a recipient device;
    a user interface configured to:
        receive a command to compose a primary communication; and
        receive a command to include a secondary communication with the primary communication; and
    a processing system configured to:
        determine a version of the secondary communication;
        determine an initial version for the secondary communication from the version;
        in response to changes made to the secondary communication, determine an updated version for the secondary communication and an extent of the changes made to the secondary communication;
        select a version field for updating based on the extent of the changes made to the secondary communication; and
        update the version by updating the selected version field, wherein the version includes two or more version fields;
    the communication interface also configured to:
        transfer the primary communication, the secondary communication, and the version to the recipient device; and
        transfer another primary communication, the secondary communication, and the updated version from the recipient device for delivery to and display by the sending device.

9. The versioning system of claim 8 wherein the primary communication is an email and the secondary communication is a computer readable file.

10. The versioning system of claim 8 wherein the version is transferred in the form of metadata.

11. The versioning system of claim 8 wherein the version is appended to the secondary communication.

12. The versioning system of claim 8 wherein the version includes one or more of a filename, an author's name, a sender's name, and a timestamp.

13. The versioning system of claim 8 wherein the version includes a version history of the secondary communication.

14. The versioning system of claim 8 wherein the version is transferred in the form of a tertiary communication.

15. A non-transitory computer-readable medium having instructions stored thereon for operating a computer system, wherein the instructions, when executed by the computer system, direct the computer system to:
    receive a command to compose a primary communication;
    receive a command to include a secondary communication with the primary communication;
    determine a version of the secondary communication;
    transfer the primary communication, the secondary communication, and the version for delivery to and display by a recipient device;
    determine an initial version for the secondary communication from the version;
    in response to changes made to the secondary communication, determine an updated version for the secondary communication and an extent of the changes made to the secondary communication;

select a version field in the processing system for updating based on the extent of the changes made to the secondary communication in the processing system;
update the version in the processing system by updating the selected version field, wherein the version includes two or more version fields; and
transfer another primary communication, the secondary communication, and the updated version for delivery to and display by another recipient device.

* * * * *